United States Patent [19]

Miller et al.

[11] Patent Number: 5,025,129
[45] Date of Patent: Jun. 18, 1991

[54] REACTOR VESSEL ANNEALING SYSTEM

[75] Inventors: Phillip E. Miller, Greensburg; Leonoard R. Katz, Pittsburgh; Raymond J. Nath, Murrysville; Ronald M. Blaushild, Export, all of Pa.; Michael D. Tatch, Randolph, N.J.; Frank J. Kordalski, White Oak, Pa.; Donald T. Wykstra, Pittsburgh, Pa.; William M. Kavalkovich, Monroeville, Pa.

[73] Assignee: The United States of America as represented by the Department of Energy, Washington, D.C.

[21] Appl. No.: 368,456

[22] Filed: Jun. 19, 1989

[51] Int. Cl.$^5$ ............................................. C21D 9/00
[52] U.S. Cl. ..................... 219/201; 219/200; 148/128; 307/9.1; 432/120; 266/87; 376/247
[58] Field of Search .................. 219/201–202, 219/200, 437; 376/463, 308, 247; 307/9.1, 10.1, 147; 148/DIG. 3, 128; 432/120; 266/87

[56] References Cited

U.S. PATENT DOCUMENTS

| | | | |
|---|---|---|---|
| 2,974,996 | 3/1961 | Bitterman et al. | 296/24 |
| 2,986,424 | 5/1961 | Larsen | 296/28 |
| 3,103,379 | 9/1963 | Stone et al. | 296/28 |
| 3,497,707 | 2/1970 | Stewart | 307/9.1 |
| 3,692,349 | 9/1972 | Ehrlich | 296/28 |
| 3,809,608 | 5/1974 | Katz et al. | 176/87 |
| 4,226,465 | 10/1980 | McCullough | 296/182 |
| 4,383,711 | 5/1983 | Dunbar | 296/181 |
| 4,408,793 | 10/1983 | Broadbent | 296/181 |
| 4,623,189 | 11/1986 | Stead | 296/181 |
| 4,652,042 | 3/1987 | Bader | 296/181 |
| 4,795,859 | 1/1989 | Kato et al. | 307/9.1 |

OTHER PUBLICATIONS

*In-Place Thermal Annealing of Nuclear Reactor Pressure Vessels*, prepared by W. L. Server for the U.S. Nuclear Regulatory Commission, NUREG/CR-4212 EGG-M-S-6708, 1985.

Primary Examiner—Bruce A. Reynolds
Assistant Examiner—John A. Jeffery

[57] ABSTRACT

A system for annealing a vessel (14) in situ by heating the vessel (14) to a defined temperature, composed of: an electrically operated heater assembly (10) insertable into the vessel (14) for heating the vessel (14) to the defined temperature; temperature monitoring components positioned relative to the heater assembly (10) for monitoring the temperature of the vessel (14); a controllable electric power supply unit (32-60) for supplying electric power required by the heater assembly (10); a control unit (80-86) for controlling the power supplied by the power supply unit (32-60); a first vehicle (2) containing the power supply unit (32-60); a second vehicle (4) containing the control unit (80-86); power conductors (18,22) connectable between the power supply unit (32-60) and the heater unit (10) for delivering the power supplied by the power supply unit (32-60) to the heater assembly (10); signal conductors (20,24) connectable between the temperature monitoring components and the control unit (80-86) for delivering temperature indicating signals from the temperature monitoring components to the control unit (80-86); and control conductors (8) connectable between the control unit (80-86) and the power supply unit (32-60) for delivering to the power supply unit (32-60) control signals for controlling the level of power supplied by the power supply unit (32-60) to the heater assembly (10).

27 Claims, 9 Drawing Sheets

REACTOR VESSEL ANNEALING SYSTEM

This invention was made under government contract, and the Federal Government may have rights in the subject invention.

CROSS REFERENCE TO RELATED APPLICATIONS

The following applications disclose subject matter which is related to the present invention. Since none of these applications have as yet been assigned a serial number, they are identified by title, and the Westinghouse Electric Corporation Docket Number:

MODULAR ANNEALING APPARATUS FOR IN SITU REACTOR VESSEL ANNEALING AND RELATED METHOD OF ASSEMBLY—368,454

WATER FILLED TANKS FOR TEMPORARY SHIELDING OF REACTOR VESSEL INTERNALS AND METHOD OF ASSEMBLY—369,433

COFFER DAM FOR TEMPORARY SHIELDING OF REACTOR VESSEL INTERNALS AND METHOD OF ASSEMBLY—368,635

ANNEALING UNIT INSERTION AND REMOVAL SYSTEM—366,503

HEATING EQUIPMENT INSTALLATION SYSTEM AND METHOD—366,495

TEMPERATURE MONITORING DEVICE AND THERMOCOUPLE ASSEMBLY THEREFOR—368,459

ELECTRIC RESISTANCE HEATER UNIT ASSEMBLY—368,432

REACTOR VESSEL NOZZLE THERMAL BARRIER—368,738

BACKGROUND OF THE INVENTION

The present invention relates to a system for effecting annealing treatments, particularly for annealing embrittled reactor vessels.

During the normal operation of a nuclear reactor, the reactor vessel, which is normally made of steel and which houses a core containing nuclear fuel, is exposed to intense radiation. Experience has shown that this radiation causes changes in the fine grain structure of the steel walls of the vessel. These structural changes make the walls brittle, a problem commonly referred to as reactor vessel embrittlement. Embrittlement reduces the flexibility of the vessel wall and increases the susceptibility of the vessel wall to fracturing, particularly if subjected to sudden stresses, such as due to operating transient events and pressurized thermal shock events.

Because of this embrittlement phenomenon, the United States Nuclear Regulatory Commission requires that a reactor vessel be removed from service when embrittlement reaches a predetermined stage, thus ending the useful life of this portion of the nuclear power plant. Replacement of such a vessel is extremely expensive because the vessel is built into and is a part of the reactor containment building, thereby making replacement economically impractical.

In order to deal with this problem, it has been proposed to subject such a vessel to annealing in place in order to restore the ductility and toughness of the metal constituting the reactor vessel.

Since it is not feasible to remove a reactor vessel from the reactor installation and transport it to an annealing facility, a practical annealing system must be capable of treating the vessel in place. However, because such an annealing treatment would be required only once, or possibly a few times, during the useful life of a vessel, it is equally unfeasible to provide annealing equipment at each reactor location, given the complexity and high cost of such annealing equipment. Finally, the transport of equipment required to perform an annealing operation by conventional transport procedures, and subsequent set up of such equipment at a reactor location would add significantly, and perhaps prohibitively, to the total cost of an annealing operation.

SUMMARY OF THE INVENTION

It is a primary object of the present invention to provide a novel annealing system which alleviates the above-discussed difficulties.

A more specific object of the invention is to provide an annealing system which can be easily transported to any reactor location and which can be coupled to the reactor vessel and placed into operation in a minimum of time.

A further specific object of the invention is to provide an annealing system in modular form with components which can be installed in semi-trailers and interconnected by cables at the work site.

A still further object of the invention is to provide a system including semi-trailers which can be loaded and unloaded rapidly, or having the required load supporting capabilities.

A further specific object of the invention is to provide a system including vehicle-mounting data processing equipment which is installed in a vibration isolating manner.

Yet another object of the invention is to provide such a system with cable connecting devices which provide support for the cables at their connecting ends.

The above and other objects are achieved according to the present invention, by a system for annealing a vessel in situ by heating the vessel to a defined temperature, comprising: electrically operated heater means insertable into the vessel for heating the vessel to the defined temperature; temperature monitoring means positioned relative to the heater means for monitoring the temperature of the vessel; controllable electric power supply means for supplying electric power required by the heater means; control means for controlling the power supplied by the power supply means; a first vehicle containing the power supply means; a second vehicle containing the control means; power conductor means connectable between the power supply means and the heater means for delivering the power supplied by the power supply means to the heater means; signal conductor means connectable between the temperature monitoring means and the control means for delivering temperature indicating signals from the temperature monitoring means to the control means; and control conductor means connectable between the control means and the power supply means for delivering to the power supply means control signals for controlling the level of power supplied by the power supply means to the heater means.

DESCRIPTION OF THE PREFERRED EMBODIMENTS

Figure 1:
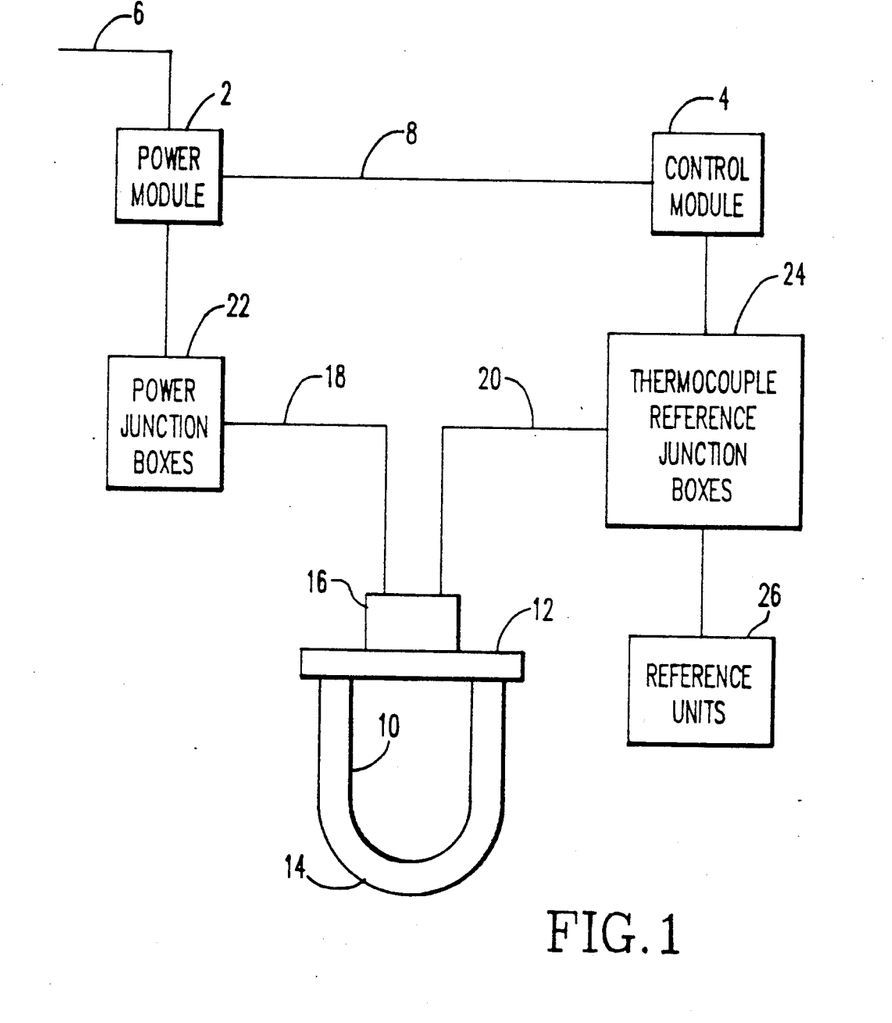
FIG. 1 is a schematic diagram of the components of a system according to the present invention.

FIG. 1 is a block diagram showing the basic components of a reactor vessel annealing system according to the present invention. The system includes a power module 2 and a control module 4, each of which is housed, according to a feature of the invention, in a semi-trailer which is transported to the annealing site by a tractor. Power module 2 includes power input cables 6 which are arranged to be connected to the electric power utility at the reactor vessel site. Power module 2 is connected to control module 4 by a series of cables 8 which are provided for the transmission of power for operation of the control module, communications signals, control signals, power measurement signals and monitoring and alarm signals.

The annealing operation is performed by means of a heater unit assembly 10 provided with a top plate 12 via which assembly 10 is support within a reactor pressure vessel 14 which is to be subjected to an annealing treatment. Assembly 10 may be transported to a job site in a container similar to that disclosed in U.S. Pat. No. 4,714,228 and in a copending, commonly owned application entitled HEATER UNIT ASSEMBLY SHIPPING CONTAINER, bearing Westinghouse docket no. 53610.

Heater unit assembly 10 carries, on its exterior surface, an array of resistance heater units and associated thermocouples for monitoring the temperature of vessel 14. Top plate 12 carries a support structure 16 which provides support and guidance for power cables 18 and thermocouple leads 20. Power cables 18 are connected to power module 2 via power junction boxes 22. Thermocouple leads 20 are connected to control module 4 via thermocouple couple reference junction boxes 24. Junction boxes 24 are additionally connected to reference units 26 which provide a temperature reference for the thermocouples and may be constituted, for example, by an ice bath.

In the operation of the system, power is supplied to heater unit assembly 10 from power module 2 and the temperature at each zone of vessel 14 is monitored, with the resulting temperature readings being supplied to control module 4. Computer systems within control module 4 process the temperature readings and supply, via cables 8, control signals for controlling the power supplied to the resistance heater units in a manner to maintain a uniform wall temperature throughout vessel 14 and to cause that temperature to vary according to a selected program.

Power junction boxes 22 may be composed of four enclosures housing transition terminals from high temperature power leads to conventional leads. In addition, power junction boxes 22 provide a convenient location for connecting back-up heaters or back-up SCR components.

Thermocouple reference junction boxes 24 are provided to minimize the amount of thermocouple extension wire needed by providing a transition to copper wire while monitoring the ambient temperature within the boxes and making appropriate compensations. In an operative embodiment of a system according to the invention, five junction box enclosures are provided, each enclosure containing eight uniform temperature reference assemblies, 263 three-pole thermocouple jacks and 16 resistance temperature detector probes. The thermocouple leads coming from the heater units of assembly 10 enter junction boxes 24 and plug into the thermocouple jacks provided therein. Copper lead wire extends from each jack to control module 4, via multi-conductor cables.

Heater unit assembly 10 may be constructed in various ways, as described in the above-referenced applications bearing the Ser. Nos. 368,432 and 368,454 and may be introduced into vessel 14 in the manner described in the above-referenced application bearing the Ser. No. 366,503.

Before introduction of assembly 10, all nozzles in the wall of vessel 14 should be blocked. This can be done in the manner described in the above-referenced application bearing the Ser. No. 368,738. These thermal barriers minimize heat transfer through the vessel nozzles during an annealing procedure, and permit a more uniform heating of vessel 14.

The system illustrated in FIG. 1 is further provided with an air evacuation assembly whose primary function is to maintain the pressure within vessel 14 at a prescribed level below atmospheric to assure that any air leakage is inward of vessel 14 and thereby prevent the uncontrolled escape of radioactive material. An embodiment of the air evacuation assembly will be described below.

A heating operation utilizing the system shown in FIG. 1 as carried out in the following manner. Firstly, with vessel 14 filled with water, all internals are removed and safely stored, using techniques as described in the above-referenced applications bearing the Ser. Nos. 366,503; 369,433; and 368,635.

Heater unit assembly 10 is then installed in vessel 14 and all water is drained out of vessel 14. Then, the heater units of assembly 10 are connected to power junction boxes 22 and the thermocouples associated with assembly 10 are connected to thermocouple reference junction boxes 24. After initiating the control computer program, heat evolution begins. Each heater unit is supplied with power independently from a respective SCR device in power module 2, controlled by analog signals from the control computer system in module 4. The computer systems in module 4 continuously receive temperature and power information, while constantly checking all system constraint parameters. Reactor vessel 14 is maintained at an assigned temperature for a designated period of time, after which a controlled cool-down operation is performed. When ambient temperature has been reached, all connections to heater unit assembly 10 are removed, and heater unit assembly 10 and the thermal barriers are removed.

Figure 2:
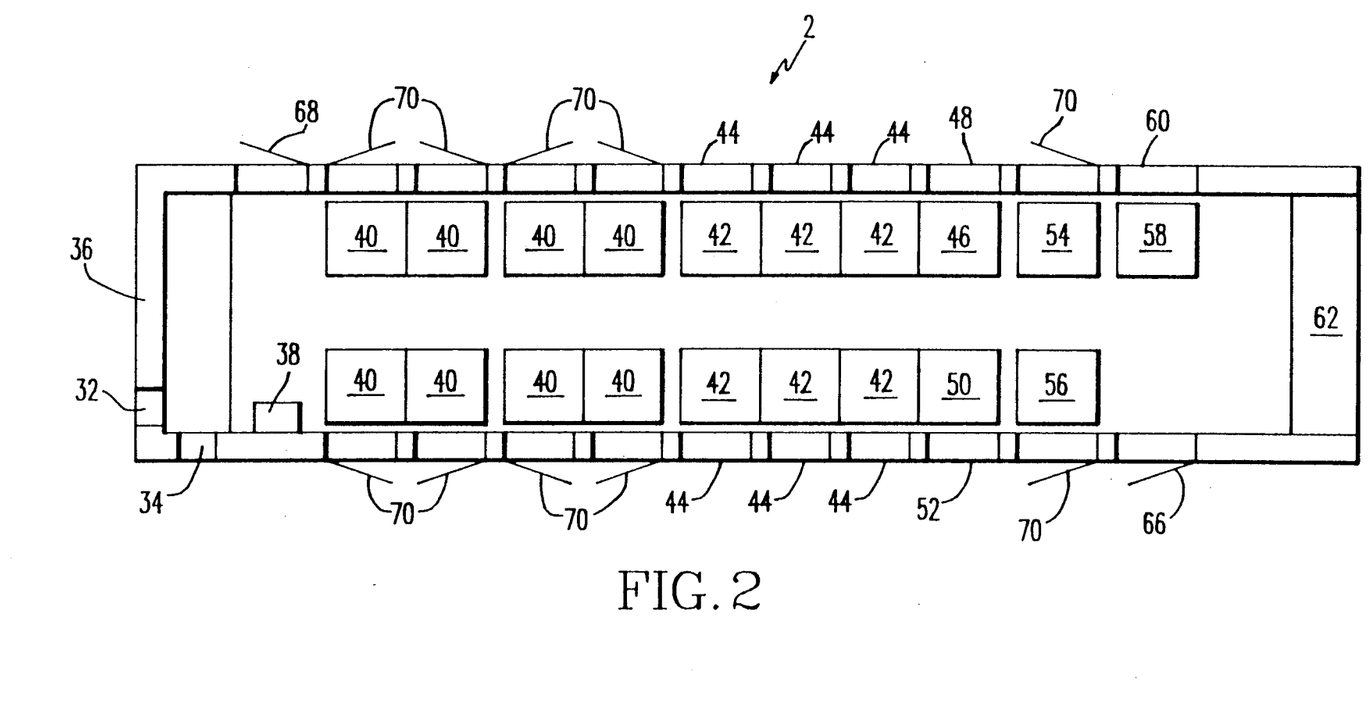
FIGS. 2 and 3 are plan views of two components of the system shown in FIG. 1.

One preferred embodiment of power module 2 is illustrated in FIG. 2, which is a plan view of a semi-trailer carrying the power module components, with the top of the semi-trailer removed.

The rear wall of the semi-trailer is provided with a primary power input panel 32 via which connections are made to the local electric power utility network. Near the rear end of the semi-trailer, along the curb side thereof, there is provided a back-up power input panel 34, which may be connected to a back-up power source such as a diesel generator. Within the semi-trailer, at the rear end thereof, there is disposed a power distribution unit 36 composed of main power circuit breakers and stepdown transformers. The power distribution unit is connected to distribute incoming power via branch circuit breakers to all electrical equipment within the power module and the control module, and thus to heater unit assembly 10.

In front of unit 36, and along the curb side of the semi-trailer, there is provided a fire detection device 38. Forward of fire detection device 38 and unit 36, and along each side of the semi-trailer, there are disposed eight power conditioners 40 which are connected to unit 36 by suitable cables, each power conditioner 40 receiving single-phase power from unit 36 and converting it into an output having a variable voltage. Each power conditioner must be armed locally within power module 2, but can only be energized by an operator in control module 4 by signals supplied via cables 8.

By way of example, unit 8 may receive three-phase input power at 480 VAC and 2000 A. Each phase is supplied to a respective pair of conditioners 40 which derive a variable output voltage of 96-200 VAC at a maximum current of 1050 A. Six of the conditioners 40 are active units, while the other two are on-line spares.

Ahead of conditioners 40 there are disposed six SCR power controller units 42 each containing, for example, 16 individual SCR single-phase AC power controllers. Each controller provides the power required by from 1-96 heater units. Demand signals provided by the computer systems in control module 4 control the operation of each controller. Each controller unit 42 is connected to a respective output connector panel 44.

Forward of the controller units 42 on the left-hand, or road, side of the semi-trailer, there is provided a terminal board connector enclosure 46 which is connected to a signal connector panel 48. The signals between the control module 4 and power module 2 are transmitted via multiconductor signal cables that connect to the signal connector panel 48 on the power module 2. These signals include: power signals from the control module 4 to the SCRs in the power module, power signals from the heaters from the power module to the control module, power conditioner parameters, etc. Wires from the signal connector panel 48 are joined in the terminal board connector enclosure 46 and connected to appropriate equipment in the power module 2. Forward of the controller units 42 on the right-hand, or curb, side of the semi-trailer, there is installed a battery back-up system 50, and adjacent system 50 the semi-trailer wall is provided with battery vents and connector panels 52. Battery back-up system 50 may be composed, for example, of 20 12-volt maintenance-free batteries and provides emergency power to the computers in control module 4 in the event of a complete AC power failure.

In front of units 46 and 50, there are disposed two uninterruptible power supplies 54 and 56 which may, for example, supply 7.5 KVA and 5 KVA, respectively, which are the primary source of operating power for the computer systems installed in control module 4.

Forward of power supply 54, there is provided a static line conditioner system 58 which contains circuit breakers, and is connected to a connector panel 60. System 58 is connected to provide high speed voltage regulation and common mode noise attenuation for the operating power supplied to the computer systems in control module 4 in the event that the primary power system fails, so that operating power is supplied to power supplies 54 and 56 from the back-up power source. At the forward end of module 2 there is provided a heating, ventilating and air conditioning system 62 which is selected to supply air to the interior of module 2 at a temperature of 75° and 50% relative humidity when the ambient air temperature is 100°.

All of the power components described thus far can be constructed according to principles known in the art and are connected together so that power for operating the heater units is provided from connector panels 44 and power for control module 4 is supplied via panels 52 and 60.

In addition, panels 32 and 34 are provided with stepdown transformers which supply 120/240 VAC for lighting and convenience receptacles within module 2.

The side walls of the semi-trailer are provided with a plurality of doors, including a main entrance door 66, a fire exit door 68 and equipment access doors 70. Finally, the semi-trailer is provided, at its bottom, with conventional jack stands (not shown) for supporting the semi-trailer after it is uncoupled from the tractor.

Thus, power module 2 is a self-contained electric power distribution system packaged in an over-the-road, environmentally controlled semi-trailer with an air-ride suspension. Because of the weight of the equipment installed in module 2, the semi-trailer is provided with triple tandem axles and a strengthened undercarriage support structure. The mounting of panels 44 on the walls of the semi-trailer allow for convenient connection of the heater unit power leads to module 2.

Power module 2 is further provided with a sound powered telephone system enabling voice communication with control module 4.

Figure 3:
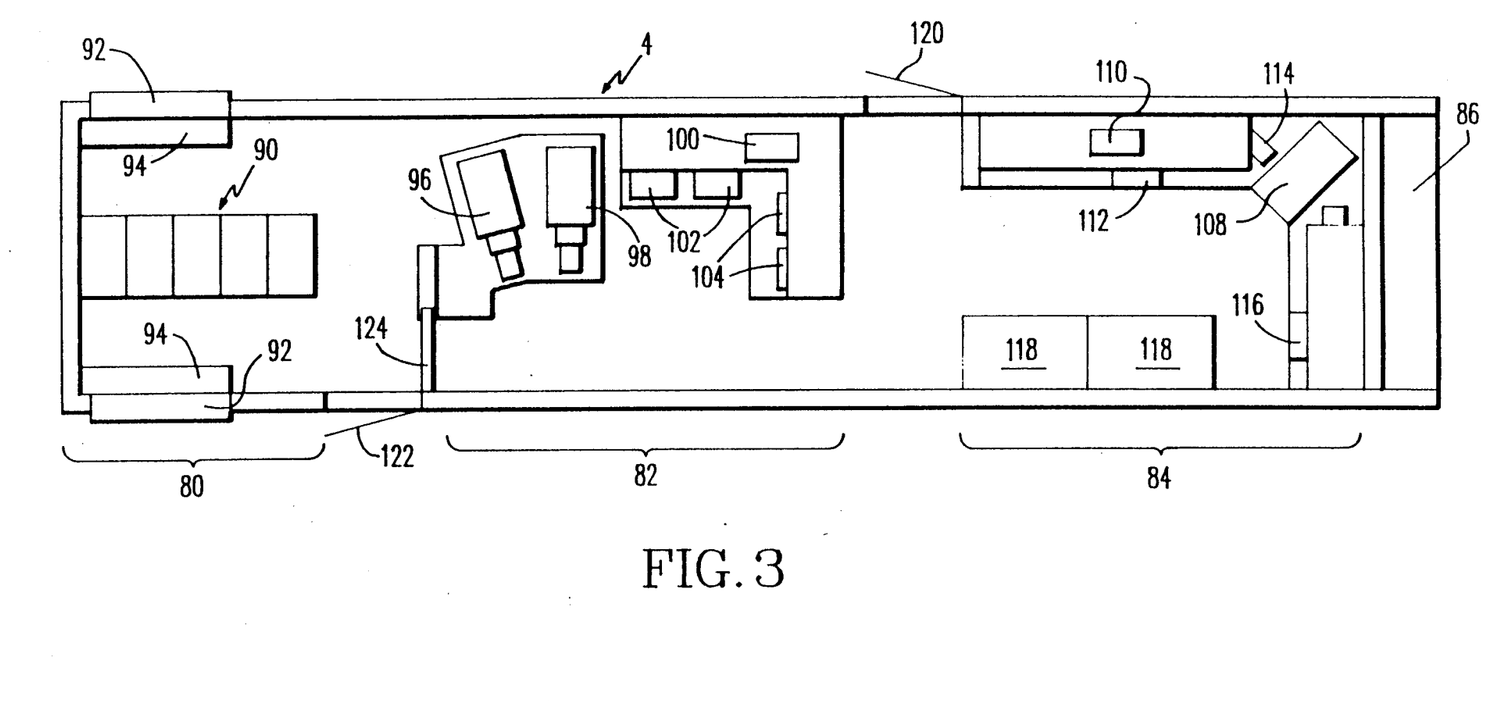

FIG. 3 provides a view similar to that of FIG. 2 of the layout of control module 4, which is also installed in a semi-trailer similar to that employed for power module 2. The semi-trailer which forms the housing for control module 4 has a dual tandem axle equipped with an air-ride suspension. At the interior, it is provided with a computer grade raised floor extending the length of the semi-trailer. Equipment which is provided in the semi-trailer, and which is not illustrated, includes a fire detection system responsive to smoke and excessive heat, including strategically located smoke/heat detectors. A battery backup is provided for the computer equipment in the event of failure of primary power sources.

Control module 4 is divided into three basic areas: a signal processor area 80; a control data acquisition station 82; and a data reduction and evaluation station 84. The forward end of the semi-trailer is equipped with a heating, ventilating and air conditioning system 86 having a capacity to maintain suitable temperature and relative humidity conditions for the installed computer equipment at ambient temperatures of between −20° and +100° F.

Signal processor area 80 is composed of signal processing equipment 90 housed in five cabinets installed at the rear of the semi-trailer, and located along the center line thereof. The signal processing equipment includes devices for conditioning and digitizing incoming signals indicative of the temperatures being monitored and the power being supplied to the heater units, and devices for providing output signals to power controller units 42 of power module 2. The signal processing unit employed is capable of processing approximately 1600 signals at a time. Area 80 further includes exterior connector panels 92 along each side of the semi-trailer and interior patch panels 94, disposed along each side at the inside of the semi-trailer. Each connector panel 92 is connected, by a plurality of connectors, to a respective patch panel 94.

Each exterior connector panel 92 is provided with two exterior covers. One cover is used during transit to protect the various connector components, while the other cover is used when cables are connected to the connector panel during operation of the system. Both covers protect the connector components from the elements, and the cover used during operation of the system also provides strain relief for the cables connected thereto. Such a covering system can also be provided for the connector panels of power module 2. One embodiment of such a cover system will be described in greater detail below.

Interior patch panels 94 allow for the convenient and rapid switching of signals between the control and data computer systems. They also provide a high density signal interface area for input and output signals. A patch panel 94 is composed of a receiver, a plug board and patchcords. The receiver is composed of a frame, a contact block and a locking mechanism which accepts a removable plug board. Input and output wires are connected at the back of the receiver contact block. The plug board is inserted at the front of the receiver and mates with contacts provided in the receiver. Patchcords are inserted at the front of the plug board and may contact with respective receiver contacts. Connection changes between input and output leads can be made by re-patching individual patchcords or by removing the entire plug board and replacing it with a different plug board which is pre-wired with a different wiring configuration.

By way of example, each patch panel 94 can be composed of a plurality of subpanels, with the panel 94 at the right-hand side of the semi-trailer providing approximately 8,000 connection points and the patch panel 94 at the left-hand side of the semi-trailer providing approximately 6,500 connection points. Within the semi-trailer, the desired connections are made by connecting selected patchcords to appropriate connectors of signal processing equipment 90.

Control data acquisition station 82 includes computer equipment which enables an operator to control and direct a vessel heat treatment process. This area is designed to that a single operator can control the entire process. Station 82 includes a control terminal 96 and a data acquisition terminal 98, each terminal being equipped with a floppy disc drive (not shown) and a CPU 100. Station 82 is further provided with printers 102 and tape decks 104. The disc drives and CPUs 100 are mounted on shock-absorbing units, which will be described in detail below. Station 82 is completed by control panels and housings which contain switching gear necessary to allow the operator to assign any of the computer loads, which may be 24 in number, to any one of the three power sources described earlier with reference to FIG. 2. Digital displays are provided to enable the operator to monitor the voltage, current and power levels of each power source. Controls are provided to enable the operator to activate any one of the eight power conditioners 40 in power module 2. An alarm panel is provided which contains equipment to allow the operator to monitor critical functions in both semi-trailers, such as power supplies and safety systems. The panels are constructed to allow easy access by maintenance personnel. Extension dampers are installed for safety on each panel so that the heavy panels can be opened slowly.

The data reduction and evaluation station 84, which is located in the forward part of the semi-trailer, houses a third computer system, which includes a terminal 108 having an associated floppy disc drive and a CPU 110. This disc drive and CPU are also mounted on special shock-absorbing supports. The computer system in station 84 further includes a tape deck 114 and a printer 116. In addition, desks 118 are provided as workstations for additional personnel. The computer system in station 84 is employed to evaluate the data collected by the computer systems in station 82.

Control module 4 is further provided with necessary circuit breakers, connector panels and junction boxes. In addition, two communication systems are provided, the first being a commercial telephone system having two incoming lines, with a plurality of telephones being spaced around module 4, and the second communication system being a sound powered telephone system connected to that in module 2.

Module 4 is completed by a main entrance door 120, an emergency exit door 122 and a sliding door 124 located between area 80 and station 82.

The computer system in data acquisition station 82 produces analog signals which control the SCR components in controller units 42. This computer system obtains thermocouple and heater unit power readings and, with the aid of a control algorithm, calculates the power required by each heater unit and predicts the vessel temperature which will result. The program recommends power settings to the operator and continually performs constraint checking. The computer system in station 84 obtains data from the computer system in station 82 and performs on-line extended functions not available on the other computer systems.

Figure 4:
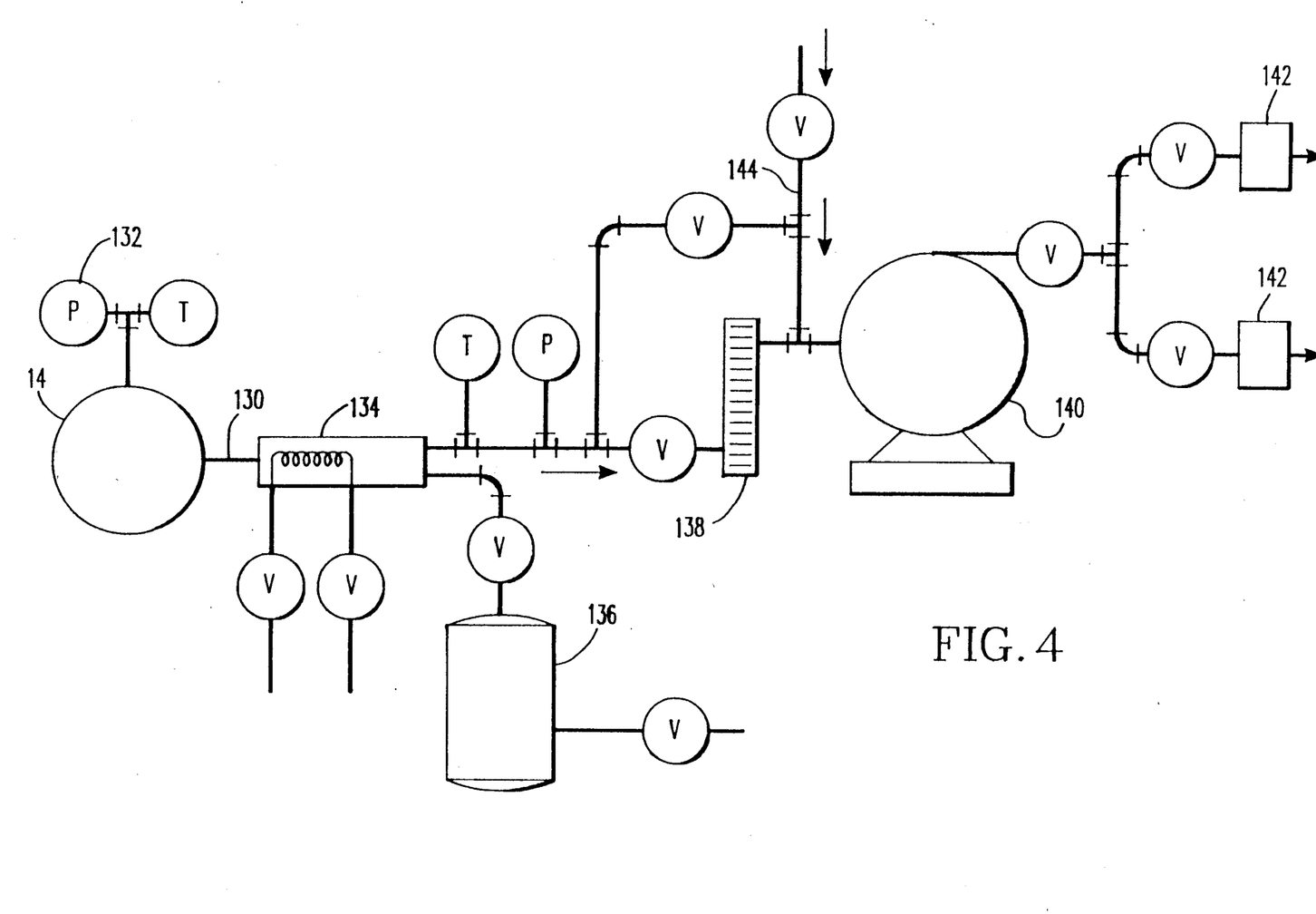
FIG. 4 is a schematic diagram of an air removal assembly employed in the system shown in FIG. 1.

One embodiment of a suitable air evacuation assembly for vessel 14 is illustrated in FIG. 4. This assembly includes an air extraction line 130 communicating with the interior of pressure vessel 14. Air extraction line 130 may extend into vessel 14 through support structure 16, top plate 12 and an opening provided at the bottom of assembly 10, in which case a sealed connection would be provided in top plate 12 for passage of line 130.

The pressure and temperature in vessel 14 may be monitored by suitable detectors 132. Air extraction line 130 extends through a heat exchanger 134, in which the air flowing through line 130 is cooled, by indirect heat exchange with water supplied by a water cooling system, in order to cool and condense any water vapor contained in the air extracted from vessel 14. The resulting condensate is collected in a condensate collector tank 136.

The dry cooled air leaving heat exchanger 134 is conducted to through a flow meter 138 and a vacuum pump 140 to filters 142 which subject the air to filtration to capture any contaminated, and particularly radioactive, particles borne in the air. After filtration, the air is substantially free of any dangerous contamination, and can be exhausted to the atmosphere.

The temperature and pressure of the cooled dried air leaving heat exchanger 134 is preferably monitored by suitable gauges, as shown. In addition, in order to maintain defined pressure and air flow conditions at the inlet side of pump 140, an air inlet line 144 is connected between the ambient atmosphere and the inlet of pump 140. As further shown, suitable valves are provided to control air and water flows.

As noted earlier herein, each of the floppy disc drives and CPUs installed in control module 4 are preferably mounted on specially designed shock mounts to eliminate the effects of any ground vibration occurring during operation of the system at a work site. While control module 4 is in transit, however, it is desired to lock out the shock mounts so that the suspension of the semi-trailer carrying module 4 will not interact with the shock mount systems. Each disc drive and each CPU is mounted on a plate which is supported at each of its four corners by a shock mounting device.

Figure 5:
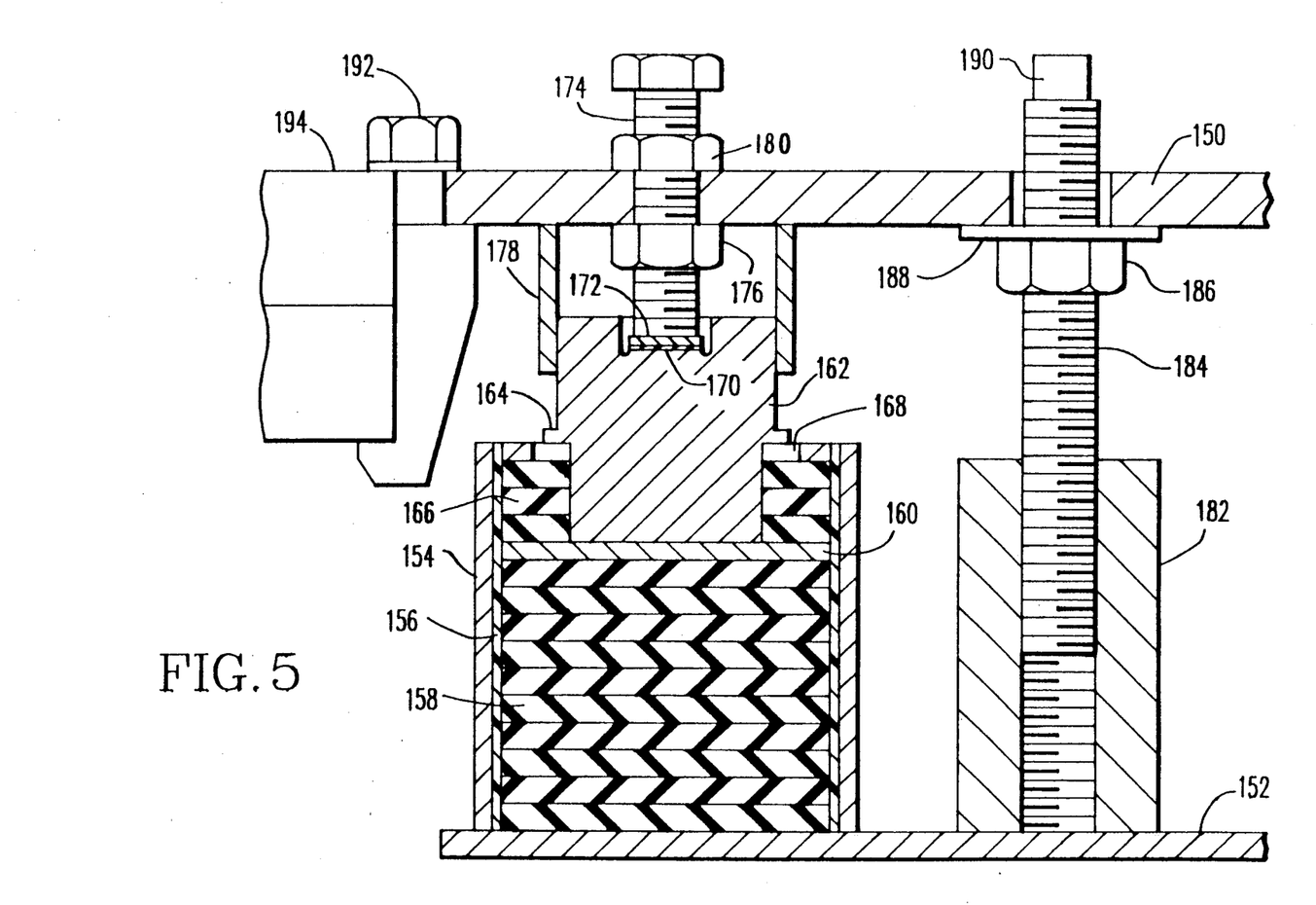
FIG. 5 is a cross-sectional elevational view of a vibration isolating component employed in the system of FIG. 1.

An embodiment of one of the shock mounting devices according to the invention for a CPU is illustrated, partly in cross section, in FIG. 5, the device supporting one corner of a plate 150 to which a CPU (not shown) is secured. Each shock mounting device is supported on a base plate 152 which is secured to a work surface in module 4.

In the embodiment shown in FIG. 5, the shock mounting device is composed of a carbon steel tube 154 welded to base plate 152. Tube 154 may have a circular, square, or other cross section.

The interior of tube 154 is lined with a plastic sheet 156, which may be made of PTFE, or a similar material. In the bottom portion of lined tube 154 there is disposed a stack of cellular pads 158, each of which may have a thickness of the order of 5 mm. In the illustrated embodiment, nine such pads are provided. These pads may be made of a cellular silicon rubber material of a type sold under the trade name "FABCELL 25". The stack of pads 158 supports a stainless steel plate 160 upon which rests a stainless steel post 162 having an outwardly extending flange 164 approximately midway between its upper and lower ends.

A plurality of annular discs 166, of the same composition and thickness as pads 158, forms a stack which rests upon plate 160 and surrounds the lower portion of post 162. A stainless steel disc 168 rests upon discs 166 and supports flange 164.

The upper end of post 162 is provided, at its center, with a recess in which is housed a plastic disc 170 and a stainless steel disc 172 which rests upon disc 170. A bolt 174 extends through plate 150 and bears upon disc 172.

Bolt 174 is threaded into a nut 176 which is welded to the underside of plate 150. Also welded to the underside of plate 150 is a tube 178 which surrounds post 162 in order to maintain post 162 centered with respect to bolt 174 and to maintain the desired orientation of post 162.

Bolt 174 is adjustable in order to level plate 150. Once plate 150 has been leveled, bolt 174 will be locked in position by a further nut 180.

The supporting device further includes a column 182 provided at its interior with a threaded, vertical bore. A threaded shank 184 engages in this bore and carries a nut 186 which supports a bronze washer 188. The vertical position of shank 184 in the threaded bore of column 182, and thus the vertical position of washer 188, can be adjusted by rotating shank 184 via a square head 190 provided at the top thereof. The purpose of shank 184 is to provide rigid support for plate 150, i.e., to disable the shock mounting, when the control module is in transit.

The locking of plate 150 can be further achieved, if desired, by a clamp 192 which clamps the edge of plate 150 to a support body 194 mounted within the control module semi-trailer.

Similarly, each disc drive can be mounted on a support plate which is supported at each of its corners by a shock mount system of the type shown in FIG. 5. However, the shock mount structure for supporting a disc drive can be generally smaller, and have fewer cellular pad layers, than the shock mounts for each CPU. If appropriate, the tube 154 and column 182 of each shock mount device can be welded to the semi-trailer floor. Under certain circumstances, and particularly in the disc drive supports, units 182–190 can be eliminated.

According to a further feature of the invention, the cables via which signals are transmitted to and from control module 4 are connected to panels 92 (FIG. 3) in such a manner that the connections are protected against environmental influences and the cables at the outside of the module are supported by a simple but effective strain relief system. One exemplary embodiment of connector panel 92 is shown is FIGS. 6 and 7.

Figure 6:
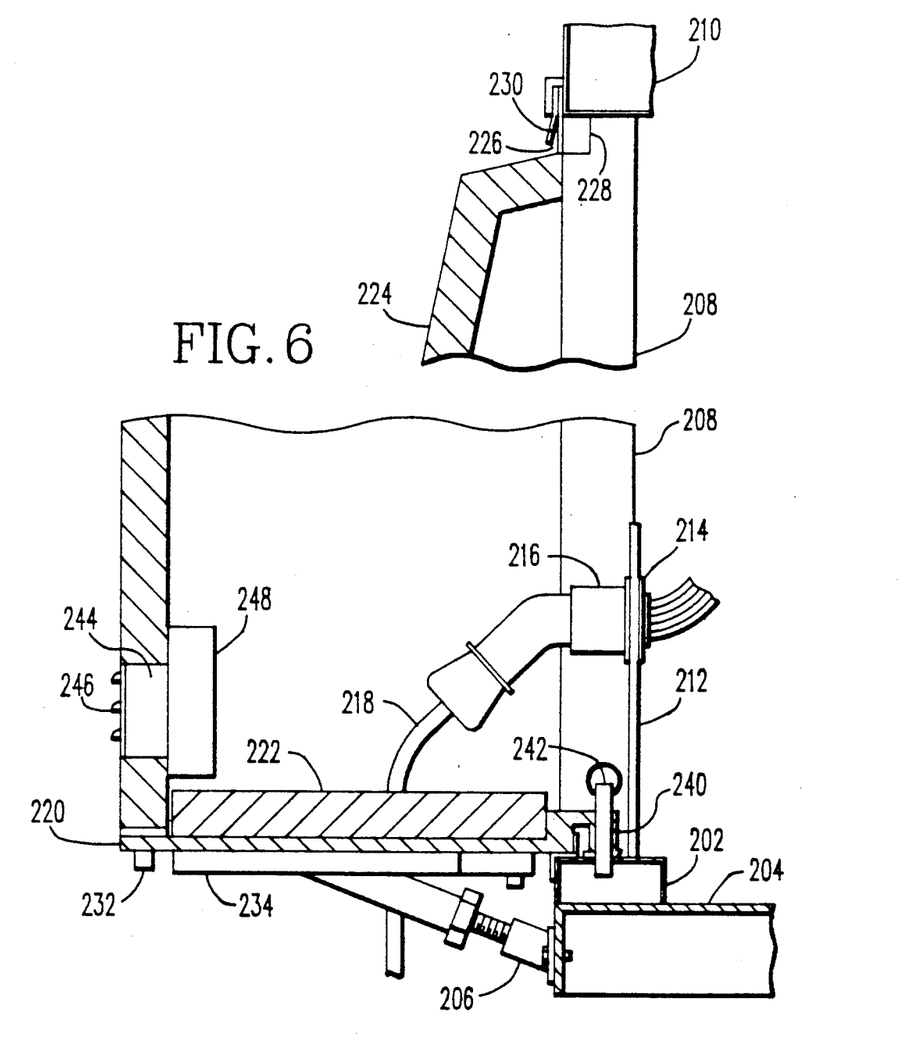
FIG. 6 is a cross-sectional elevational view of a cable supporting unit employed in the system of FIG. 1.

The connector panel shown in FIG. 6 is mounted in an opening provided in the semi-trailer carrying module 4 and is supported by a channel member 202 resting on semi-trailer floor 204 and a plurality of struts 206 bolted to a side wall of semi-trailer floor 204. The connector panel includes a rectangular frame 208 which extends between channel member 202 and semi-trailer side wall 210.

Frame 208 supports a plurality of panel plates 212, one of which is shown in FIG. 6. Each panel plate 212 is provided with a plurality of multi-terminal connector elements 214 each configured to mate with a connector element 216 fastened to the end of a cable 218 which extends from the control module semi-trailer to either power module 2 or junctions boxes 24 (FIG. 1). Connector elements 214 and 216 may form a screw-type connection.

At the exterior of the semi-trailer, the connector panel includes a horizontal support plate 220 which supports a closure base 222 and a panel cover 224 which covers the panel along its front and along both vertical sides, i.e., panel cover 224 includes a portion which is parallel to frame 208 and two end portions which extend between the parallel portion and the side walls of the semi-trailer.

Panel cover 224 includes, at its top, an upwardly extending lip 226 which engages between a support member 228 and a drip edge 230, both of which are secured to the semi-trailer wall. The lower edge of cover 224 rests upon support plate 220 and is secured thereto by a plurality of retaining pins 232.

Closure base 222 rests upon plate 220 and is held in place by a rim at the inner edge of plate 220 and by cover 224. Plate 220 and base 222 are provided with openings for passage of cables 218.

At the bottom of support plate 220, there are secured, by a plurality of machine screws, a plurality of cable blocks 234 each of which exerts a clamping action on one row of cables to provide the desired strain relief.

Figure 7:
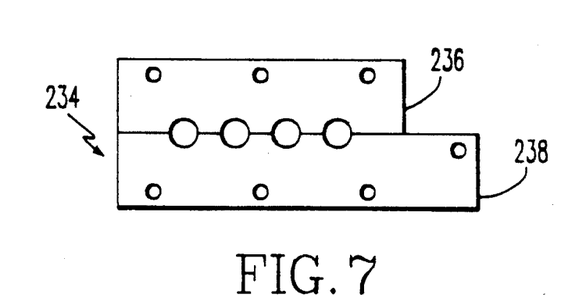
FIG. 7 is a detail plan view of one component of the arrangement shown FIG. 6.

One such cable block 234 is shown in bottom plan view in FIG. 7, from which it will be seen that each such block is composed of two parts 236 and 238 each provided with recesses defining one-half of a plurality of cable passages. These recesses are dimensioned such that when block parts 236 and 238 are mounted on the bottom of plate 220, they exert a clamping action on the associated cables 218.

Returning to FIG. 6, the inboard side of support plate 220 is supported on a pedestal 240 which rests on channel member 202 and is retained in position by a plurality of retaining pins 242.

The portion of panel cover 224 which is generally parallel to the semi-trailer wall is provided with a plurality of air flow passages 244, one such passage being provided, for example, at each corner of cover 224. Each air flow passage 244 is covered by a louver assembly 246 and, in the region enclosed by cover 224, by a filter device 248. The purpose of filter devices 248 is to permit a certain air flow within the region enclosed by cover 224 while blocking the introduction of contaminants which could adversely effect the connections provided between elements 214 and 216.

The entire cover assembly is to be removed when module 4 is in transit. To effect removal, all connector elements 216 are removed from their associated connector elements 214 and cable blocks 234 are removed from support plate 220. Then, cables 218, with their associated connector elements 216, can be withdrawn through the openings in plate 220 and base 222. Thereafter, retaining pins 232 are extracted, so that panel cover 224 can be removed. Then, closure base 222 is removed, after which struts 206 are disconnected from semi-trailer floor 204 and retaining pins 242 are removed, so that plate 220 can be withdrawn. Struts 206 may remain connected to plate 220, or can be disconnected therefrom, the connection between plate 220 and struts 206 being effected by a plurality of machine screws or bolts. All removed parts can then be stored inside the semi-trailer. In addition, during transit, each connector element 214 can be provided with a protective cap, and the connector panel can be covered by a flat cover which conforms essentially to the semi-trailer wall.

Since the performance of annealing treatments at different sites may require different power module and/or control module configurations, and it would not be economical to provide a plurality of semi-trailers each equipped with a different module configuration, it is desirable to be able to replace or rearrange module components in a speedy manner. In addition, particularly with regard to power module 2, the equipment to be housed in the associated semi-trailer is relatively heavy, so that the semi-trailer must have a substantial load supporting capability.

Conventional semi-trailers generally have solid side walls which form rigid load-supporting structures with the semi-trailer floor and roof, and are provided with a single access door in the rear, and possibly one additional access door in one side wall. Of course, since all loading and unloading of such semi-trailers must be effected via these doors, such operations are relatively time consuming. In addition, if a semi-trailer is to be capable of supporting particularly heavy loads, it is common practice to construct the side walls so that they will, together with the floor and roof, form a structure having a high degree of rigidity, and to provide load supporting beams below the floor.

According to a further aspect of the present invention, use is made of semi-trailers which can be loaded and unloaded at substantially any location along the sides and which do not require substantial longitudinal beams beneath the floor, other than in the region of the axles, and yet provide a substantial load-supporting capability.

Figure 8:
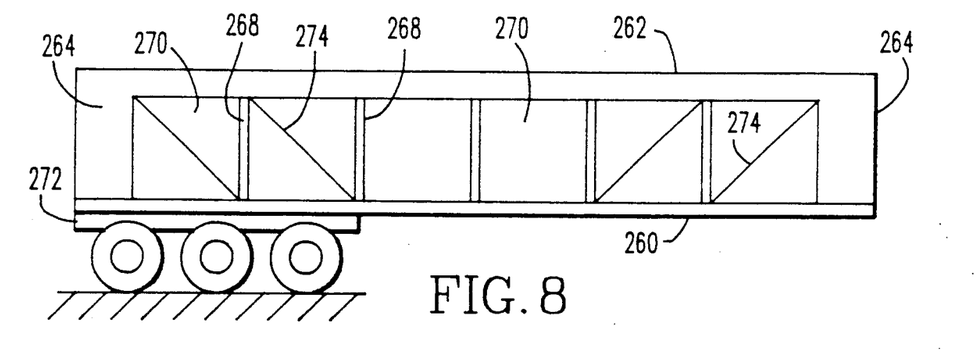
FIG. 8 is a side elevational view of one embodiment of a vehicle employed in the system of FIG. 1.

One embodiment of a semi-trailer according to the present invention is illustrated in FIG. 8 in the form of a triple-axle semi-trailer composed of a floor member 260, a roof member 262 and front and rear pylons 264. Each side of the semi-trailer is constituted by vertical hangers 268 which are connected to floor member 260 and roof member 262 to serve as tension members which transmit loads supported by floor member 260 to roof member 262. Between hangers 268 there are installed removable panels 270 which will be in place when the semi-trailer is being transported. The other side of the semi-trailer is constructed in an identical manner.

The semi-trailer is supported on the wheel axles by a selected number of longitudinal beams 272, each of which may be in the form of a channel and is confined to the region of the wheel axles.

Each hanger 268 is easily removable to facilitate access to the interior of the semi-trailer. Normally, before any one hanger 268 is removed, temporary support for floor member 260 should be installed beneath the location of that hanger.

Roof member 262 is supported by pylons 264, which can be constructed in accordance with usual engineering principles to provide the requisite load supporting capability. The pylons at the rear of the semi-trailer will be directly supported by the semi-trailer axles, while the pylons 264 at the forward end of the semi-trailer will be directly supported either by the tractor, during travel, or by a conventional stand which is normally provided when a semi-trailer is detached from its tractor. Roof member 262, supported by pylons 264, in turn contributes substantially to supporting the semi-trailer load, as the result of the transmission of load forces from floor member 260 to roof member 262 via hangers 268.

By employing the semi-trailer roof as a load-supporting member in this manner, convenient side loading of the semi-trailer becomes possible, without requiring the use of longitudinal beams below floor member 260, which would reduce the road clearance of the semi-trailer and would interfere with use of such a semi-trailer as a containerized shipping unit.

For supporting extremely heavy loads, or if the semi-trailer is to be lifted, for example onto a railroad flatcar, there may be additionally provided diagonal structural members 274. Alternatively, or in addition, the structure can be reinforced by means of flexible cables (not shown) extending between the tops of a front and rear pylon 264 along each side of the semi-trailer. Each cable has a center portion which is located within floor member 260 and extends along a substantial portion of the length of the semi-trailer, and end portions which extend diagonally to fastening points on pylons 264. These cables are placed under tension in order to impart a compressive prestress to the semi-trailer structure. Diagonals 274 and the above-mentioned cables may be removed for loading and unloading of the semi-trailer. If the semi-trailer is to be lifted, lifting connections can be provided at the upper ends of the two hangers 268 which are closest to the front and rear ends of the semi-trailer, these being the most advantageous lifting points.

Figure 9:
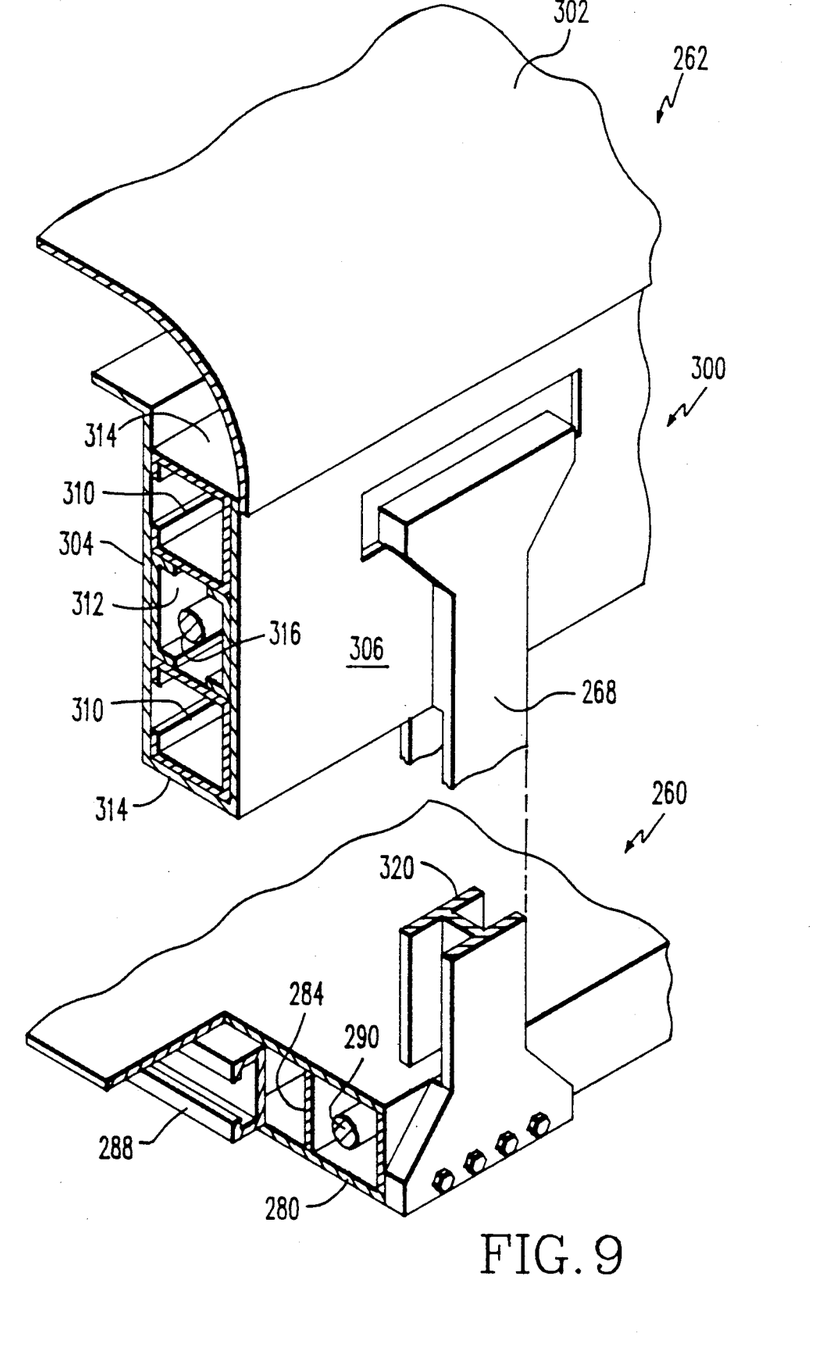
FIG. 9 is a cross-sectional perspective view of a portion of the structure of FIG. 8.

One preferred form of construction for floor member 260 and roof member 262 of the semi-trailer is illustrated in a detail view in FIG. 9. In this embodiment, floor member 260 includes plate members forming a hollow box 280 provided, across the width of the semi-trailer, with longitudinally extending, vertically oriented supporting plates 284. Further disposed within box 280 are transverse beams 288 in the form of C-channels. Each beam 288 extends across substantially the entire width of box 280, and plates 284 are interposed between longitudinally adjacent beams 288. In addition, along each side of box 280 there is provided a cable 290 which extends the length of the semi-trailer and is connected at each end to a fitting via which cable 290 is placed under tension, to thereby impart a compressive prestress to floor 260. Such a prestress increases the resistance of floor 260 to bending.

Roof member 262 is constituted by two side supporting structures 300, each located along one side of the semi-trailer, with a canopy member 302 extending over the length and width of the semi-trailer, between structures 300. Canopy member 302 need not provide any significant load-supporting capability, and its primary purpose is to enclose the top of the semi-trailer.

Each structure 300 extends between, and is supported by, the pylons 264 along the associated side of the semi-trailer and is composed of an inner vertical plate 304 terminating at the top in a horizontal portion, and an outer vertical plate 306.

Between plates 304 and 306 there are connected upper and lower C-channel members 310 with two narrow channel members 312 being interposed between members 310. Structure 300 is completed by upper and lower horizontal plate members 314 which may be welded to the adjacent channel members 310, and to plates 304 and 306.

Within the space enclosed by channel members 312, there is provided a cable 316 which is fastened at the front and rear ends of the semi-trailer in the same manner as that described above with respect to cable 290. Here again, the prestress produced by cable 316 increases the bending resistance of structure 300. All of the components of structure 300 can be bolted, riveted, or welded together, as dictated by standard engineering practice.

A hanger 268 is connected between structure 300 and floor member 260 by being pivotally mounted to structure 300 and bolted to floor member 260. Between the bottom of structure 300 and the upper surface of floor member 260, hanger 268 is widened to provide channels 320 for receiving side closing panels.

The upper end of hanger 260 is received in an opening provided in plate 306 and the upper one of channel members 310, this opening being given a height sufficient to allow hanger 268 to be pivoted upwardly through an angle of 90° after the bolts securing hanger 268 to floor member 260 have been removed. Then, equipment can be installed in, or removed from, the portion of floor member 260 which is made accessible by this removal of hanger 268.

Figure 10:
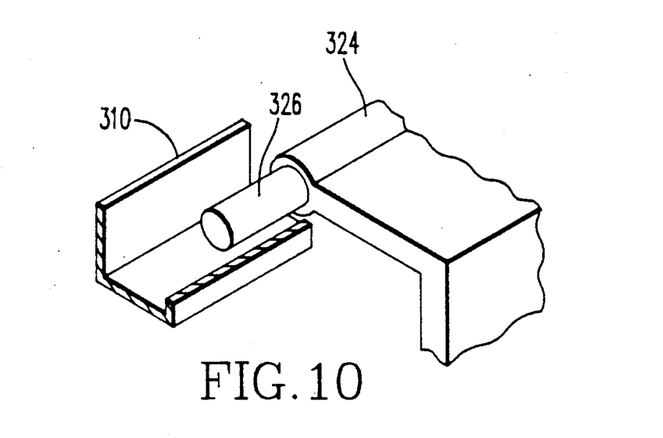
FIG. 10 is a perspective detail view of a portion of the structure shown in FIG. 9.

The pivotal connection between hanger 268 and structure 300 can have any suitable form, one example of which is shown in FIG. 10 where the upper end of hanger 268 is provided with a tubular sleeve portion 324 which receives a solid shaft 326 that is supported by the upper one of channel members 310. Each end of shaft 326 may be welded to upper channel member 310. Since channel members 312 and the lower one of channel members 310 extend below the opening provided for receiving sleeve portion 324, the load supporting capability of structure 300 is not significantly impaired.

According to an alternative form of construction, shaft 326 could be secured to a support within the upper channel member 310 at a height sufficient to permit the lower web of that channel member to extend along the entire length of the semi-trailer side while providing clearance for sleeve portion 324, i.e., so that sleeve portion 324 is located above that web. Then, it would only be necessary to provide an opening in the vertical web of the upper channel member 310 to receive sleeve portion 324.

Figure 11:
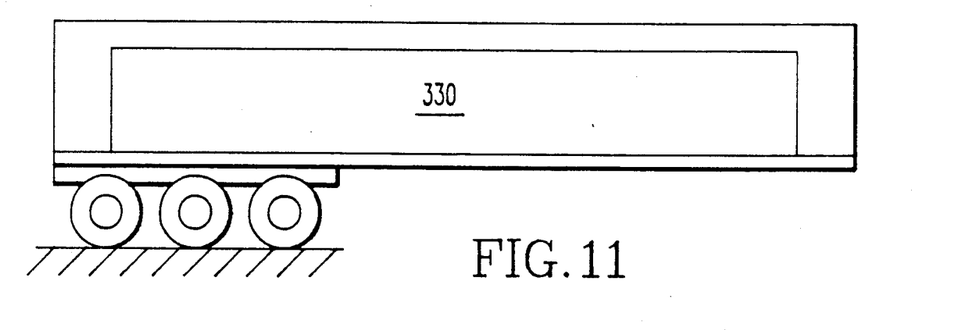
FIG. 11 is a side elevational view of another embodiment of a vehicle employed in the system of FIG. 1.

A second embodiment of a semi-trailer according to the invention is shown in FIG. 11 and differs from the embodiment of FIG. 8 in that, in place of hangers 268 and panels 270, there is provided, along each side of the semi-trailer, a single door 330 which can be either a rigid member which is installed so as to be raised and lowered vertically or can be composed of a plurality of articulated segments which enable the door to be rolled up under the semi-trailer roof. In the latter arrangement, the interior of the semi-trailer would be provided, in the vicinity of the roof, with a suitable support structure for guiding door 330. Such a support structure could be composed of rollers over which the door is guided and a motor driven cable mechanism for raising and lowering the door.

In either case, door 330 will be provided at the top and bottom with a plurality of locking members via which the door, when closed, is locked to the roof member and the floor member of the semi-trailer in order to enable the roof member to participate in supporting the loads on floor 260. Arrangements for locking door 330 to each roof structure 300 and to floor member 260 are shown in FIGS. 12 and 13.

Figure 12:
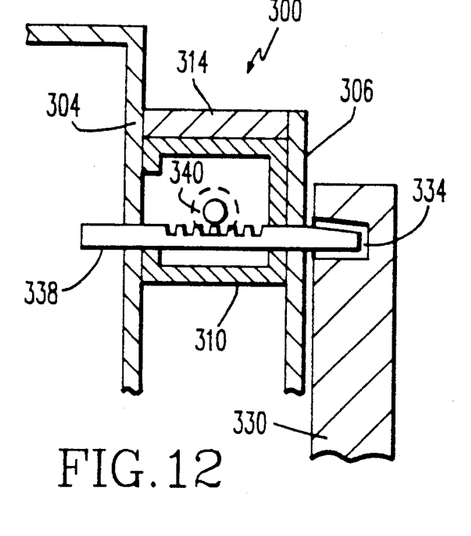
FIGS. 12 and 13 are cross-sectional detail views of portions of the embodiment shown in FIG. 11.

FIG. 12 illustrates an embodiment of a locking mechanism associated with roof structure 300. Door 330 is provided, near its upper edge, and at the surface which faces inwardly of the semi-trailer, with a plurality of openings 334 each arranged to receive a bolt 338 which extends through plates 304 and 306 and the upper channel member 310. Bolt 338 is provided with a tooth portion to engage a gear 340 mounted on a shaft which extends the length of the semi-trailer. The outer end of bolt 338 is tapered to insure a secure engagement in opening 334. A plurality of openings 334 and bolts 338 are distributed along the length of structure 300, the number thereof being selected as a function of the load level to be supported. Each bolt 338 is associated with a respective gear 340.

By rotation of gears 340, for example by means of an electric motor secured to the shaft which carries all of the gears, all of the bolts 338 can be extended to engage in openings 334 or retracted to permit raising of door 330.

Figure 13:
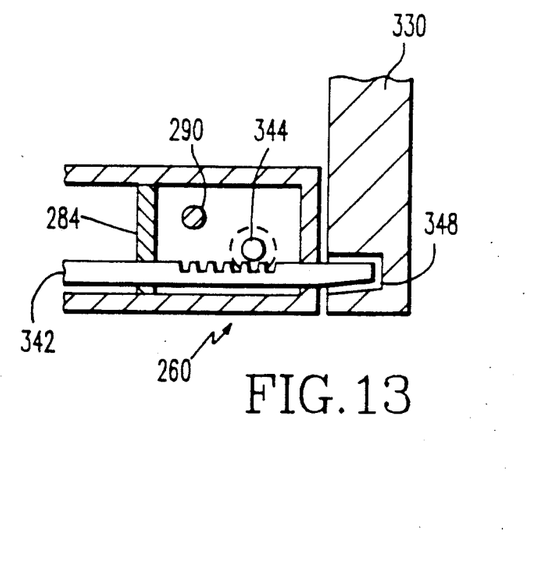

A similar arrangement for the lower edge of door 330 is illustrated in FIG. 13. Here, each bolt 342 is supported by a vertical plate 284 and the outer vertical edge of box 280 and is driven by a gear 344 carried by a shaft which extends along the length of the semi-trailer and carries further gears each cooperating with a respective bolt. The lower edge of door 330 is provided with a plurality of openings 348 each of which is engaged by a respective bolt 342. Bolt 342 is tapered along its lower edge to assure secure engagement in the associated opening 348. Again, rotation of the shaft carrying gears 344 can move bolt 342 into the locking position shown in FIG. 13 or into a retracted position for permitting door 330 to be raised.

Figure 14:
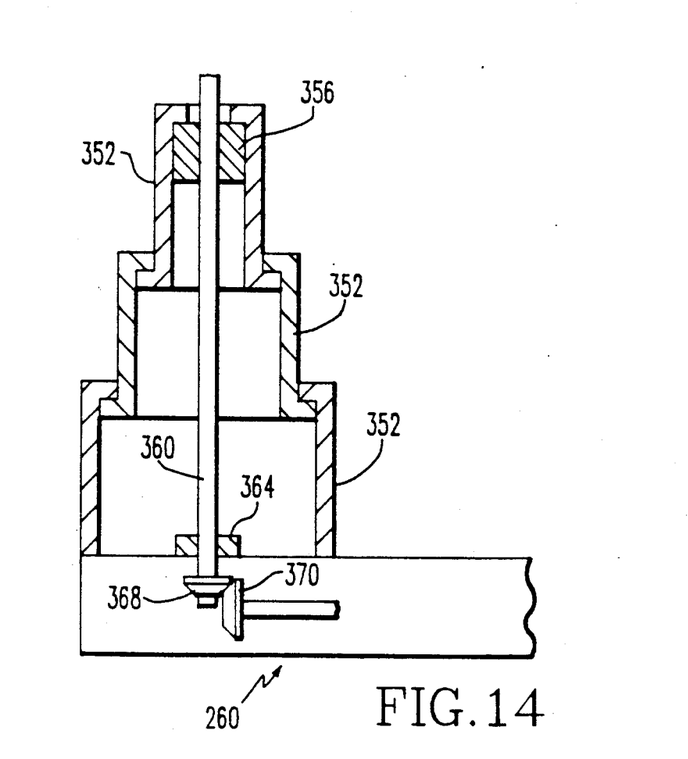
FIG. 14 is a simplified elevational view of a component employed in the embodiment of FIG. 11.

One embodiment of a mechanism for raising and lowering door 330 is illustrated schematically in FIG. 14. One such mechanism is provided along each vertical edge of the door, i.e., adjacent each of pylons 264 (FIG. 8). The mechanism is composed of a plurality of nested channel members 352 telescoped vertically one within the other. Door 330 is provided at the lower end of each vertical edge with a horizontally projecting ear 356 provided with a vertically extending threaded bore. Within this bore there is engaged a threaded shaft 360 which is supported on floor 260 by a suitable bearing 364. The lower end of shaft 360 carries a bevel gear 368 engaging a bevel gear 370 carried by the shaft of an electric drive motor. Rotation of shaft 360, via gears 368 and 370, acts to raise and lower the door via ears 356. During raising, channel members 352 will move upwardly, each channel member being lifted by the channel member which it encloses. Thus, in a simple manner, a door can be guided during opening and closing movements.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A system for annealing a vessel in situ by heating the vessel to a defined temperature, comprising: electrically operated heater means insertable into the vessel for heating the vessel to the defined temperature; temperature monitoring means positioned relative to said heater means for monitoring the temperature of the vessel; controllable electric power supply means for supplying electric power required by said heater means; control means for controlling the power supplied by said power supply means; a first vehicle containing said power supply means; a second vehicle containing said control means; power conductor means connectable between said power supply means and said heater means for delivering the power supplied by said power supply means to said heater means; signal conductor means connectable between said temperature monitoring means and said control means for delivering temperature indicating signals from said temperature monitoring means to said control means; and control conductor means connectable between said control means and said power supply means for delivering to said power supply means control signals for controlling the level of power supplied by said power supply means to said heater means.

2. A system as defined in claim 1 wherein each said vehicle is a semi-trailer constructed to travel on roads.

3. A system as defined in claim 2 wherein said first vehicle comprises: a roof constructed to support heavy vertical loads; a floor for supporting said power supply means; and load transmitting means connected along each side of said semi-trailer for transmitting vertical loads imposed on said floor to said roof.

4. A system as defined in claim 3 wherein: said load transmitting means comprise a plurality of tension members connected between said roof and said floor; and said first vehicle further comprises a plurality of removable side panels each held between two adjacent tension members.

5. A system as defined in claim 4 wherein each said tension member is pivotally connected to said roof and detachably connected to said floor.

6. A system as defined in claim 3 wherein said load transmitting means comprise: at least one door mounted to be opened vertically; and means for securing said door to said roof and said floor in a load transmitting manner.

7. A system as defined in claim 6 wherein said door is mounted to open by moving downwardly below said floor.

8. A system as defined in claim 1 wherein said power supply means comprise: means for receiving power from power supply mains; and means for modifying the power received from the power supply mains and for supplying the modified power to said power conductor means.

9. A system as defined in claim 8 wherein said control means are operable to generate the control signals for controlling the operation of said means for modifying power.

10. A system as defined in claim 9 wherein said control means comprise: a first work station having means for acquiring data from said temperature monitoring means; and a second work station having means coupled to said means at said first work station for evaluating data acquired at said first work station and deriving control signals therefrom.

11. A system as defined in claim 10 wherein said means at said first work station are operable for receiving signals representative of the modified power supplied to said power conductor means.

12. A system as defined in claim 1 wherein said power conductor means comprise: first power conductors connectable to said power supply means; second power conductors connectable to said heater means; and a plurality of power junction boxes for conductively connecting said first and second power conductors together.

13. A system as defined in claim 1 wherein said signal conductor means comprise signal conductors connectable to said control means; and a plurality of junction boxes for conductively connecting said signal conductors to said temperature monitoring means.

14. A system as defined in claim 1 further comprising means for maintaining a subatmospheric pressure in the vessel while said heater means are inserted in the vessel.

15. A system as defined in claim 14 wherein said means for maintaining a subatmospheric pressure in the vessel when said heater means are inserted in the vessel comprise conduit means insertable into the vessel.

16. A system as defined in claim 15 wherein said means for maintaining a subatmospheric pressure further comprise: pump means coupled to said conduit means for producing an air flow from the vessel through said conduit means sufficient to maintain a subatmospheric pressure in the vessel when said heater means are inserted in the vessel; and filter means coupled to said pump means for filtering solid contaminants out of the air flowing from the vessel.

17. A system as defined in claim 16 wherein said means for maintaining a subatmospheric pressure further comprise: heat exchanger means for cooling air flowing through said conduit means to a temperature at which at least a substantial portion of the vapor in the air condenses; and a receptacle coupled to said heat exchanger means for receiving and storing liquid which condenses in said heat exchanger means.

18. A system as defined in claim 1 wherein said control means comprise at least one data processing system having a device whose operation can be impaired by mechanical vibrations; and device support means mounted in said second vehicle for supporting said device, said device support means including vibration isolating means for preventing the transmission of vibrations from said second vehicle to said device.

19. A system as defined in claim 18 wherein said device support means comprise: a support plate to which said device is secured; and a plurality of bearing members supporting said plate and resting upon a surface in said second vehicle, said vibration isolating means being associated with said bearing members.

20. A system as defined in claim 19 wherein said vibration isolating means comprise a body of resilient material in each said bearing member.

21. A system as defined in claim 20 wherein said body of resilient material in each said bearing member comprises a stack of cellular rubber discs interposed in load bearing relation between said support plate and the surface in said second vehicle.

22. A system as defined in claim 21 wherein each said bearing member further comprises means for limiting horizontal movements of said support plate relative to said second vehicle.

23. A system as defined in claim 1 wherein at least one of said conductor means comprises a plurality of cables, and further comprising conductor connecting means for said one of said conductor means, mounted on one of said vehicles, said connecting means comprising: a panel mounted in a wall of said one vehicle; a plurality of connectors for establishing electrical connections to said cables; and cable support means for mechanically supporting said cables, when said cables are connected to said connectors, in order to relieve stresses on said cables at the location where said cables are connected to said connectors.

24. A system as defined in claim 23 wherein said cable support means are detachably secured to said panel.

25. A system as defined in claim 24 wherein said conductor connecting means further comprise a weather-protecting cover secured to said panel for protecting said connectors against environmental influences.

26. A system as defined in claim 25 wherein said cover is detachably secured to said panel.

27. A system as defined in claim 26 wherein said cover is provided with ventilation openings and further comprises air filter means covering said openings.

* * * * *